United States Patent [19]
White

[11] 3,850,405
[45] Nov. 26, 1974

[54] CONTAMINANT RESISTANT VALVE

[75] Inventor: Albert H. White, Wethersfield, Conn.

[73] Assignee: Chandler Evans Inc., West Hartford, Conn.

[22] Filed: July 5, 1973

[21] Appl. No.: 376,325

[52] U.S. Cl.......... 251/61.5, 137/514.3, 137/543.15, 137/533.27
[51] Int. Cl.......................................... F16k 31/165
[58] Field of Search....... 137/514.3, 543.15, 533.27; 251/61.5, 335 A, 54

[56] References Cited
UNITED STATES PATENTS

| | | | |
|---|---|---|---|
| 609,726 | 8/1898 | Ball | 137/514.3 |
| 1,373,906 | 4/1921 | Needham | 137/514.3 |
| 1,874,135 | 8/1932 | Spoor | 251/54 |
| 2,675,204 | 4/1954 | Johnson | 251/335 A X |
| 2,914,078 | 11/1959 | McGowen, Jr. | 137/514.3 X |
| 3,482,777 | 12/1969 | Quinn | 251/61.5 X |

*Primary Examiner*—William R. Cline
*Attorney, Agent, or Firm*—R. W. Luther; Richard A. Dornon

[57] ABSTRACT

A contaminant resistant valve has a valve element mounted in a cavity in generally spaced relationship to the wall of the cavity. The valve element has a recess which receives a fixedly mounted guide shaft for sliding engagement with the recess wall. A diaphragm is secured to the recess wall and the guide shaft to seal the recess from contaminated fluid in the cavity. The diaphragm and the base of the recess define first and second chambers on opposite sides of the area of sliding engagement. The chambers are fluidly interconnected by a passage in the shaft and are filled with oil to lubricate the sliding engagement and to furnish viscous damping.

3 Claims, 2 Drawing Figures

CONTAMINANT RESISTANT VALVE

BACKGROUND OF THE INVENTION

The invention generally relates to valves and, more particularly, to pressure and flow regulating valves which are adapted to be exposed to a contaminated fluid. Even more particularly, the invention relates to pressure and flow regulating valves in fuel controls.

Pressure and flow regulating valves, incorporated in fuel control systems adapted to meter contaminated fuel, must be provided with a means to prevent contaminants from lodging between the sliding surfaces and impeding valve movement. Typically, such valves have annular grooves in the guides thereof which are supplied with a filtered, pressurized wash flow to prevent the contaminants from entering the area between the sliding surfaces and to entrain the contaminants interposed between the sliding surfaces. Wash lines must be included in the fuel control casing to transfer the filtered, pressurized fuel to the grooves. The source of filtered pressured fuel in this type of system is usually a filter which is located immediately downstream of the main fuel pump and also supplies the servo flow for the various components of the fuel control. Obviously, if a contaminant is unyielding to the impetus of the wash flow or if the wash line becomes clogged, valve performance may be impaired.

In addition, the design problems associated with sliding valves in fuel controls are not susceptible to facile solutions with regard to damping characteristics. This is attributable to the large variations in fuel viscosity occasioned by temperature changes.

SUMMARY OF THE INVENTION

The invention provides a valve which is not only insensitive to contaminants in the flow controlled thereby, but is also guided along a surface lubricated by a hydraulic oil to facilitate valve movement and furnish essentially constant damping characteristics. In addition, a valve according to the invention obviates the provision of costly wash lines and associated elements.

A valve of the invention incorporates a valve element mounted within a cavity of a housing in generally spaced relationship to the cavity wall such that no sliding contact is engendered therebetween. In lieu of the guiding contact furnished by the cavity wall in prior art valves, a guide shaft, fixedly secured to the housing, extends from the cavity wall into a recess in the valve element for guiding the valve element in its movement between seated and unseated positions. Hydraulic oil is sealed within the recess to lubricate the sliding engagement between the guide shaft and the valve element and also to furnish predictable damping characteristics.

A valve of the invention is ideally suited for inclusion in a fuel control because of the salient features referred to hereinabove. However, a valve of the invention may also find application in other environments where contaminated fluid is controlled and/or viscous damping is a problem.

Accordingly, it is a primary object of the invention to provide a contaminant resistant valve which does not require wash flow for proper functioning.

Another object is to provide a valve having acceptable viscous damping characteristics which are essentially independent of the fluid flow traversing the valve.

A further object is to provide a valve adapted for inclusion in a fuel control.

These and other objects and advantages of the invention will become more readily apparent from the following detailed description, taken in conjunction with the accompanying drawings, in which:

DETAILED DESCRIPTION OF PREFERRED EMBODIMENT

Figure 1:
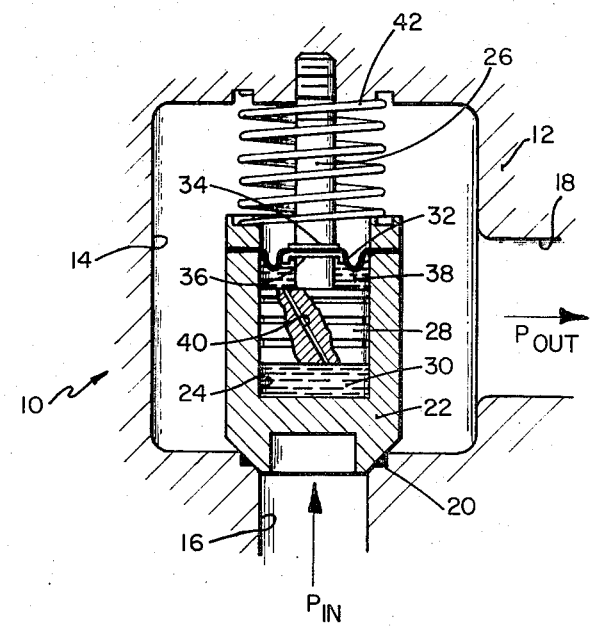
FIG. 1 is a schematic view of a valve according to the invention utilized as a pressure relief valve.

Turning now to FIG. 1, there is shown a pressure relief valve, generally designated 10. Pressure relief valve 10 has a housing 12 in which a cavity 14 is formed. The housing 12 also defines first and second ports 16 and 18, respectively, which communicate with the cavity. As depicted in FIG. 1, the first port 16 functions as an inlet port and the second port 18 functions as an outlet port. A valve seat 20 surrounds the first port 16 for contacting an axial end of the valve element 22 and sealing the inlet port 16 from the cavity 14.

The valve element 22 has a recess 24 fashioned therein which is cylindrical to present a surface for guiding the valve in axial movement between seated and unseated positions. A cylindrical guide shaft 26, having an enlarged diameter portion 28 to present a cylindrical surface over which the cylindrical surface of the valve element is adapted to slide, is fixedly secured to the housing 12 such that it extends into the cavity 14 and is received by the recess 24. The valve element 22 is arranged within the cavity 14 so that it does not slide along the wall of the cavity 14 during movement between the seated and unseated positions. In addition, when the valve element 22 is seated, the end of the guide shaft 26 is axially spaced from the base 24a of recess 24, whereby a first chamber 30 is formed by the enlarged diameter portion 28 of the shaft 26.

A diaphragm 32 extends across the recess 24, slightly below the mouth thereof, and is fixedly secured to the cylindrical wall of the recess and is secured to the shaft by washers 34 and 36 so as to seal at least a portion of the recess from the cavity. The diaphragm 32 is spaced from the enlarged diameter portion 28, and hence from the cylindrical surfaces of the valve element 22 and the enlarged diameter portion 28 which are in sliding engagement thereby to define a second sealed chamber 38 separated from the first chamber 30 by the area of cylindrical surface engagement which is coextensive with the enlarged diameter portion 28.

The first and second chambers 30 and 38, respectively, are filled with an hydraulic oil, such as silicon fluid, for lubricating and damping the sliding engagement between the valve element 22 and the guide shaft 26. It is necessary, of course, to provide a fluid connection between the chambers 30 and 38 in order to permit the trapped oil on one side of the enlarged diameter portion 28 to be displaced to the other side thereof during movement of the valve element. To this end, enlarged diameter portion has a passage 40 which fluidly interconnects chambers 30 and 38. It should be apparent that the type of oil selected (which would preferably possess an essentially constant dynamic viscosity for the anticipated range of fuel temperature) and the size of the passage, 40, are determinative of the valve's damping characteristics. Hence, the oil serves a dual purpose in that it not only furnishes lubrication but also provides viscous damping.

A spring 42 is interposed between the valve element 22 and the housing 12 to bias the valve element 22 into the seated position. By virtue of the provision of the spring 42, valve 10 is adapted to function as a pressure relief valve. It should be apparent that when the differential pressure (Pin − Pout) attains a predetermined value wherein the valve element 22 is subjected to a resultant opposing force which equals the spring load, a further increase in Pin causes the valve element 22 to unseat in such a manner that (Pin − Pout) is maintained at an essentially constant value, neglecting flow force effects.

Figure 2:
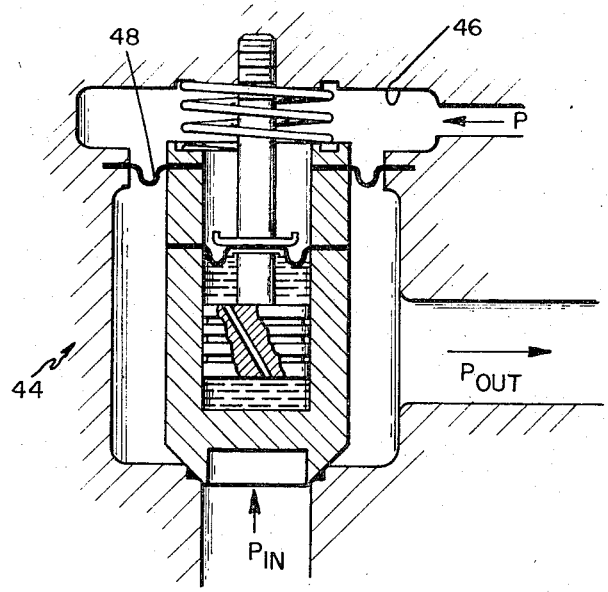
FIG. 2 is a schematic view of a valve according to the invention utilized as a differential pressure regulator.

Referring to FIG. 2, there is shown a differential pressure regulating valve 44 which could be utilized, for example, as a metering head regulator in a fuel control. The valve 44 is basically similar to the valve 10 of FIG. 1. However, valve 44 differs from valve 10 in that a third port 46 is provided to communicate a pressure P (a sensed pressure) to the end of the valve element remote from the seat 20. In addition, an annular diaphragm 48 is connected to the periphery of the valve element so that the axial end thereof, which is remote from valve seat 20, is exposed to the pressure P instead of the pressure P out. It will thus be appreciated that third port 46 is isolated from the first and second ports. When the differential pressure (Pin − P) exceeds a predetermined value, the valve element unseats to maintain this differential pressure at an essentially constant value. In a fuel control in which it is desired to maintain a constant head (Pin − P) across a metering valve, port 18 would normally serve to bypass flow to the inlet side of the main fuel pump.

It will be understood that the valve of the invention may find utility in devices other than fuel controls. In addition, it will be appreciated that the recess depicted need not be cylindrical along its entire length since only a small guide surface will normally be mandated. Moreover, the guide shaft may be of a constant diameter if the upper portion of the recess 24 is of an enlarged diameter. With regard to the passage 40, it should be apparent that a passage disposed in the valve element 22 or between the shaft and the recess would also be suitable.

While I have described what I regard as the preferred embodiment of my invention, it will be understood that the details of construction may be varied within wide limits without departure from the scope of the invention as defined in the appended claims.

I claim:

1. A contaminant resistant valve comprising:
    a housing having a cavity therein and first and second ports communicating with the cavity;
    a valve seat surrounding the first port;
    a guide shaft, having a cylindrical surface, secured to the housing and extending into the cavity;
    a valve element, having a recess therein with a cylindrical surface, positioned in the cavity for axial movement between seated and unseated positions such that the respective cylindrical surfaces are in sliding engagement whereby movement of the valve element is guided by the shaft, such that the guide shaft is axially spaced from the base of the recess when the valve element is seated to thereby define a first chamber and such that the valve element is in spaced relationship to the wall of the cavity whereby it does not slide therealong during movement between the seated and unseated positions;
    a diaphragm extending across the recess and fixedly secured to the wall thereof and the shaft to seal at least a portion of the recess from the cavity, the diaphragm being spaced from the cylindrical surface of the recess which slidingly engages the guide shaft to define a second chamber separated from the first chamber by the area of cylindrical surface engagement;
    hydraulic oil in the first and second chambers for damping and lubricating the sliding engagement between the valve element and the guide shaft;
    passage means to fluidly interconnect the first and second chambers for enabling oil trapped in the first and second chambers to be displaced during valve element movement; and
    whereby contaminants in the fluid entering the cavity via the first port and leaving the cavity via the second port will not hinder movement of the valve element.

2. A contaminant resistant valve, as defined in claim 1, further including:
    means to bias the valve element into the seated position.

3. A contaminant resistant valve as defined in claim 2, wherein the cavity includes a third port and further including:
    a diaphragm connected to the periphery of the valve element and the housing such that the axial end of the valve element remote from the valve seat is exposed to the pressure of the third port and the third port is isolated from the first and second ports.

* * * * *